United States Patent [19]

Bellio

[11] Patent Number: 4,735,508
[45] Date of Patent: Apr. 5, 1988

[54] METHOD AND APPARATUS FOR MEASURING A CURVATURE OF A REFLECTIVE SURFACE

[75] Inventor: Stephen L. Bellio, Denver, Colo.

[73] Assignee: Honeywell Inc., Minneapolis, Minn.

[21] Appl. No.: 869,642

[22] Filed: Jun. 2, 1986

[51] Int. Cl.⁴ .............................................. G01B 11/24
[52] U.S. Cl. .................................... 356/371; 73/45.4; 73/52; 209/524; 209/529; 209/587; 209/597; 209/598; 209/928; 356/240
[58] Field of Search ............... 356/237, 240, 371, 376; 209/522, 524, 525, 529, 579, 587, 597, 598, 928; 73/52, 41.3, 45.3, 45.4

[56] References Cited

U.S. PATENT DOCUMENTS

| | | | |
|---|---|---|---|
| 2,446,628 | 8/1948 | Brown | 356/371 |
| 2,524,929 | 10/1950 | Razek | 209/529 |
| 3,131,815 | 5/1964 | Mathias | 209/525 |
| 3,788,750 | 1/1974 | Maltby, Jr. et al. | 356/239 |
| 4,165,939 | 8/1979 | Woodrow et al. | 356/237 |

Primary Examiner—Davis L. Willis
Assistant Examiner—Matthew W. Koren
Attorney, Agent, or Firm—Mitchell J. Halista; Albin Medved

[57] ABSTRACT

A method for measuring a curvature of a reflective surface includes the steps of directing a pair of collimated light beams onto a substantially smooth portion of the reflective surface and measuring the separation of the light beam images reflected from the surface as a representation of the curvature of the surface. An apparatus utilizing this method includes a pair of lasers for producing respective collimated light beams, a laser mount arranged to direct the separate light beams from the lasers as substantially parallel light beams onto a substantially smooth portion of a reflective surface being measured to produce respective bright spots on the surface, receiving images of the bright spots onto a diffuse target surface, viewing these bright spot images with a sensor to produce a light intensity pattern encompassing the spots and calculating the separation of the bright spot images from the light intensity pattern as a measure of the curvature of the surface.

14 Claims, 3 Drawing Sheets

METHOD AND APPARATUS FOR MEASURING A CURVATURE OF A REFLECTIVE SURFACE

BACKGROUND OF THE INVENTION

1. Field of the Invention

The present invention relates to surface curvature detectors. More specifically, the invention is directed to a method and apparatus for detecting the curvature of a reflective surface.

2. Description of the Prior Art

In order to detect the curvature of a surface, the prior art devices have included the use of dial indicators for measuring the displacement of the surface from a reference plane. An electronic curvature measuring apparatus has used the curved surface and a reference surface as capacitor plates with the capacitance of the capacitor being affected by the curvature of the surface being analyzed. While such a electronic tester eliminates the mechanical contact and possible damage necessitated by the dial indicator measuring device and is amenable to as rapid measuring operation, it also is limited in that the reference plate and the surface being analyzed must be electrically conductive in order to provide the electrical conduction for the capacitor form thereby. Accordingly, it would be desirable to provide a method and apparatus for measuring the curvature of a surface without the need for a mechanical contact with the surface and having the attributes of being useful for measuring the curvature of a non-metallic surface and providing a rapid measurement operation.

SUMMARY OF THE INVENTION

An object of the present invention is to provide an improved method for measuring a curvature of a relective metal surface.

Another object of the present invention is to provide an apparatus utilizing a novel method for measuring a curvature of a reflective surface.

In accomplishing this and other objects, there has been provided, in accordance with the present invention a method for measuring a curvature of a reflective surface utilzing the steps of generating a pair of spaced apart substantially parallel collimated light beams, directing the pair of light beams separately to a substantially smooth portion of the reflective surface having a curvature to be measured to produce a pair of bright spots on the surface, receiving images of the bright spots onto a diffuse target surface, viewing these bright spot images with a sensor to produce a light intensity pattern encompassing the spots and calculating the separation of the bright spot images from the light intensity pattern as a measure of the curvature of the surface. An apparatus for measuring a curvature of a reflective surface comprising light source means for producing a first substantially collimated light beam and a second substantially collimated light beam substantially parallel to and spaced from said first light beam, means for mounting said source means to direct said first and second light beams onto a substantially smooth portion of the reflective surface to be measured, target surface means for receiving the reflected light beams from the surface to be measured, sensor means for calculating the separation of a pair of bright spot images, formed on the target surface by the reflected light beams.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
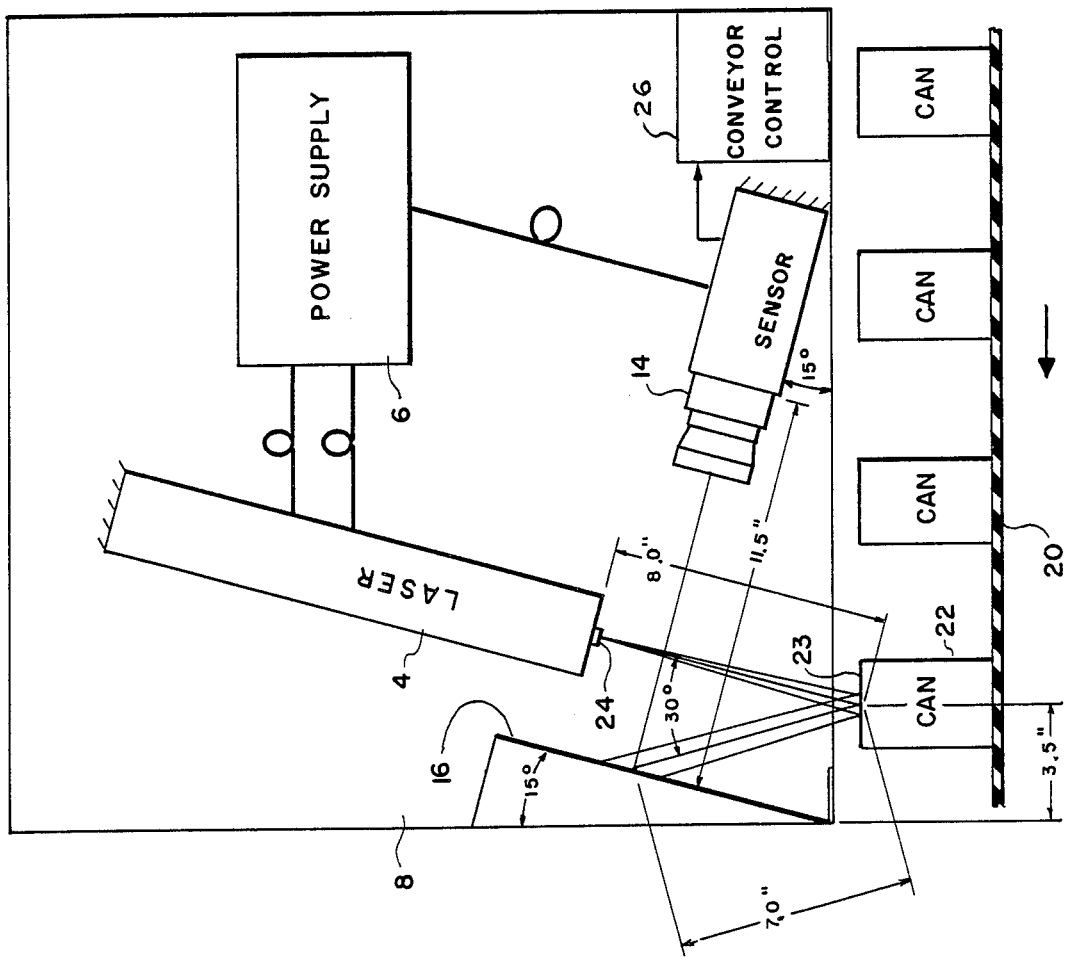
FIG. 1 is a pictorial illustration of an apparatus utilizing the method of the present invention for detecting vacuum level in sealed cans.
Figure 2:
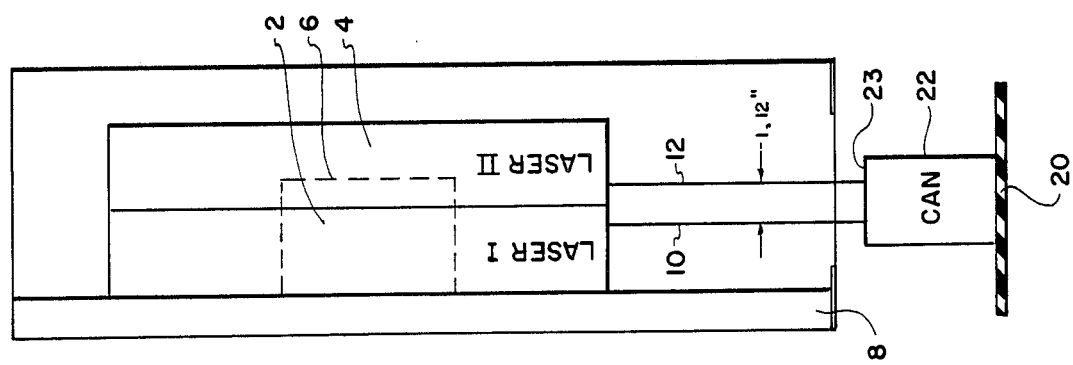
FIG. 2 is a pictorial side view of the apparatus shown in FIG. 1.
Figure 3:
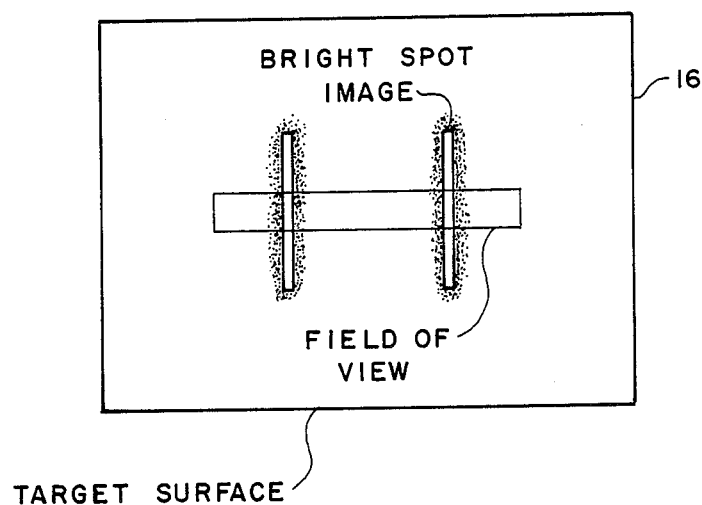
FIG. 3 is a pictorial illustration of the diffuse target surface as viewed from the sensor, depicting the bright spot images reflected from the can lid and the field of view of the sensor.

Referring to FIGS. 1 and 2, there is shown an apparatus utilizing the method of the present invention for measuring the curvature of a reflective surface. This apparatus uses a pair of lasers 2,4 which are separately energized from a power supply 6. A mounting plate 8 is used to mount the lasers 2,4 and the power supply 6. The lasers 2,4 are mounted in a fixed relationship to produce a pair of substantially parallel collimated light beams 10,12. The lasers 2,4 may each be helium-neon lasers such as those manufactured by Joden Laser of Ann Arbor, Mich. and identified as HN-05MSH. Such lasers are well-known in the art and a further description thereof is believed to be unnecessary for a complete understanding of the present invention. A sensor 14 is also mounted on the plate 8 to maintain a preferred orientation, as discussed hereinafter. The sensor 14 may be an optical gauge such as the HVS 200 series edge/width gauge manufactured by the Visitronic Operation of Honeywell Inc. in Englewood, Colo. This sensor uses a light sensing element in the form of a row of twenty-three charge-coupled devices (CCD) to provide individual analog output signals corresponding to the light intensity input to each CCD. An internal conventional microprocessor and a stored program are used by the sensor 14 to calculate the separation of a pair of bright images and to compare the calculated separation with a stored reference separation to produce outputs representative of a curvature of a reflective surface as discussed further hereinafter. A diffuse target surface 16, is also mounted on the plate 8 to receive the bright spot images from a surface being analyzed and to enable a viewing of the bright spot images by the light sensor 14.

In the embodiment of an example of the present invention as illustrated in FIGS. 1 and 2, the curvature measuring apparatus is used to detect the vacuum level in so-called vacuum packed cans by detecting the curvature of an end surface of the can as a representation of the vacuum level within the can. A conveyor belt 20 is arranged to transport the cans, e.g., can 22, past the light beams 10,12 to produce a pair of bright spots on a suitable substantially smooth portion of an end surface 23 of the can 22. The dimensions of the apparatus shown in FIGS. 1 and 2 are selected for use with a typical can having a diameter of 2.7 inches and a height of four inches. Accordingly, the plate 8 is mounted by any suitable means (not shown) adjacent to the end surface 23 of the can 22 on the conveyor belt 20 with the separation of the end surface 23 from a cylindrical lens of the lasers 2,4, e.g., lens 24 of laser 4, by a distance of eight inches. The distance from the center of the image area on the end surface 23 of the can 22 to the center of the reflected image on the target 16 is seven inches while the angle between the light beams directed toward the end surface 23 of the can 22 and the reflected light images from the end surface 23 is 30°. Finally, the separation of the diffuse target surface 16 and the light sensor element within the light sensor apparatus 14 is 11.5 inches. The output from the sensor 14 is applied to a conveyor control 26 to produce a desired control operation, e.g., removal of a defective can from the conveyor belt 20.

Figure 6:
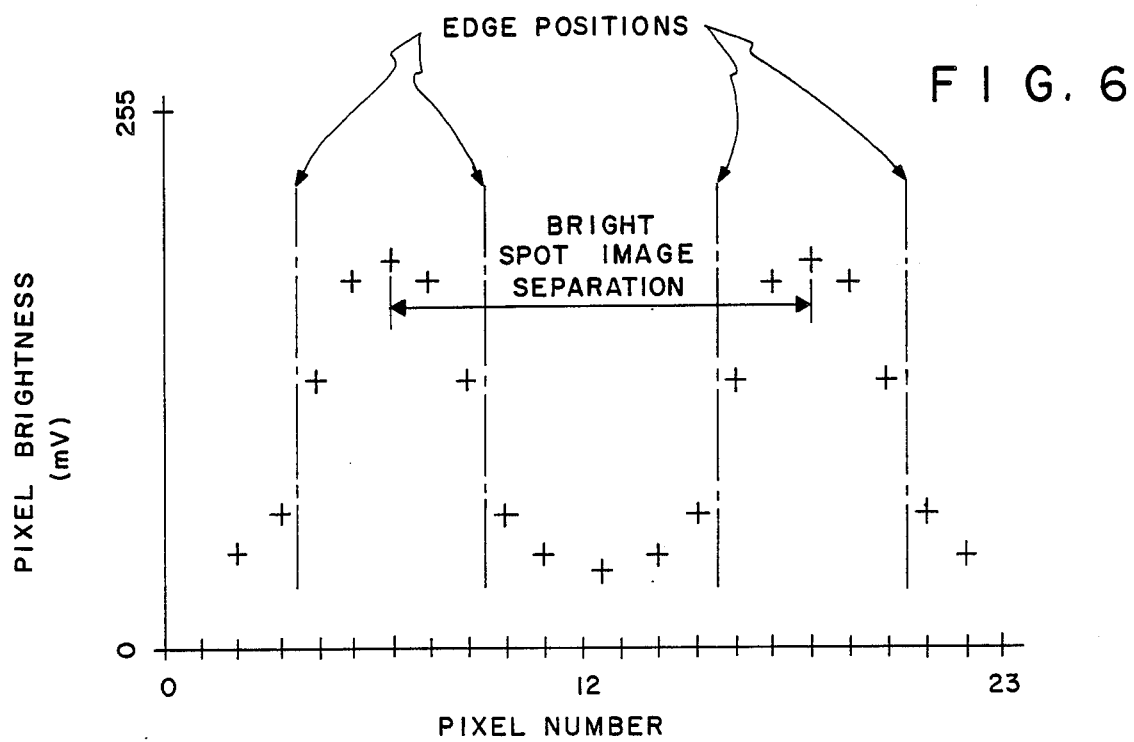

The sensor apparatus 14 is arranged to be mounted on the plate 8 at an angle of 15° with respect to an end surface of the plate 8 which is effective to produce an orthogonal relationship between an axis of the light sensor 14 and the diffuse target surface 16. Each CCD in the sensor 14 is identified as a pixel inasmuch as it senses an imaged element of the field of view being monitored by the sensor 14, i.e., each pixel measures the brightness level of its image portion of the field of view. The overall combination of pixel, or CCD, outputs is identified as the signature of the image and is shown in FIG. 6. The four edge positions shown in FIG. 6 are calculated by the sensor 14, and then the distance between the two laser reflections from the can lid, or bright spot images, is calculated and compared to a reference or acceptable "OK" distance corresponding to an acceptable or "OK" vacuum in the can 22. Specifically, each CCD analog output signal is converted to a corresponding digital value by an analog-to-digital converter. A stored algorithm in a memory accessed by the internal microprocessor in the sensor 14 is used on the digital values of the signature of the image to ascertain two edges of each polarity, i.e., left dark and right dark, by locating the two largest monotonically increasing curves and the two largest monotonically decreasing curves. The position of these four edges is then calculated by interpolation to achieve sub-pixel resolution. These edge positions are then used to determine the exact location of the laser bright spot images and the distance between them. The details of a specific algorithm for calculating the aforesaid relationships is believed to be unnecessary inasmuch as it is capable of being developed in a conventional fashion by a skilled computer programmer using the aforesaid relationships. The sensor 14 is arranged to provide three outputs which are identified as "vacuum too low", "vacuum OK" and "vacuum too high".

Figure 4:
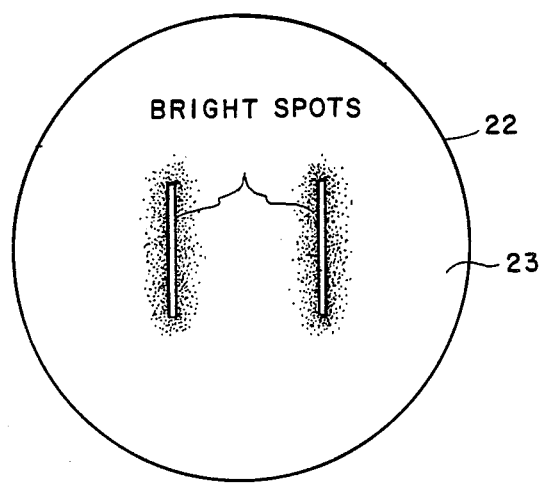
FIG. 4 is a pictorial illustration of the surface of the can having a curvature to be measured by the apparatus shown in FIGS. 1 and 2 and illustrating the bright spots created by the lasers.
Figure 5:
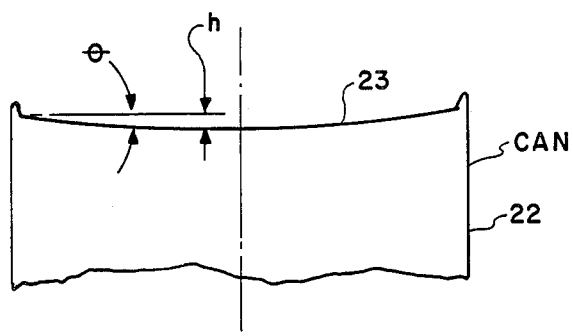
FIG. 5 is a pictorial front view of a can having a curvature to be measured by the apparatus shown in FIGS. 1 and 2 with a depiction of the factors used in the method of calculating the curvature of the surface to be measured and FIG. 6 is a diagram of the light image pattern seen by the sensor when viewing the bright spot images produced on the diffuse target surface by the apparatus shown in FIGS. 1 and 2.

Using the dimensions shown in FIGS. 1 and 4, the following calculations demonstrate the accuracy of the measurement using the illustrated arrangement.

In the embodiment of the invention described above, the field of view of sensor 14, i.e., the HVS 200, is two inches. A desired accuracy for determining the separation of the bright spots is 1/100 of the field of view or 0.020 inches. To ascertain the accuracy of measuring "h", the displacement "h" needed to change the separation of the bright spots by 0.020 in. wherein each line moves 0.010 in. in opposite directions is calculated. Given that the distance between the target or mirror 16 and the top surface 23 of the can 22 is seven inches, then the change in the angle $\theta_A$ of the laser beam to achieve a 0.010 in. bright spot displacement is:

$$\tan \theta_A = 0.010/7.0$$

or $$\theta_A = \arctan 0.010/7.0 = 0.0818°.$$

Using a segment of 0.6 inches of the displaced or curved reflective surface, the displacement "h" is related to the angle of displacement $\theta$ by:

$$\tan \theta = h/0.6$$

Using the angle of 0.0818:

$$h = (0.6 \text{ in.}) \tan (0.0818°) = 0.0009 \text{ in.}$$

which is the accuracy for measuring the displacement "h". Thus, the system can measure the dimension "h" to an accuracy of approximately 0.001 in. whereby if the can lid deflects by 0.001 in., the distance between the bright lines changes by 0.020 in. on a surface having a substantially uniform reflectivity.

The outputs of the sensor 14 can be applied to the conveyor control 26 to produce a desired control operation with respect to a can having an undesired internal vacuum level. Inasmuch as the curvature measurement operation is performed at high speed using optical and electronic operations, the conveyor belt 20 can be a continuously moving system, e.g., 600 cans per minute, with the curvature detection being effected when the can enters a preset location as detected by a timing signal from any suitable device, e.g., a so-called photocell using an interruption of a light beam, such devices being well-known in the art.

Accordingly, it may be seen that there has been provided, in accordance with the present invention, an improved method and apparatus for measuring a curvature of a reflective surface.

The embodiments of the present invention in which an exclusive property or privilege is claimed are defined as follows:

1. A method for measuring a curvature of a reflective surface including the steps of directing a pair of spaced apart substantially collimated light beams onto a substantially smooth portion of the reflective surface to produce a pair of bright spots on the surface, receiving images of the bright spots onto a diffuse target surface, viewing these bright spot images with a sensor to produce a light intensity pattern encompassing the spots and calculating the separation of the bright spot images from the light intensity pattern as a measure of the curvature of the surface.

2. A method as set forth in claim 1 and including the further step of comparing the calculated separation of the bright spot images with a reference separation to produce an output signal representative of an acceptable separation corresponding to an acceptable curvature of the reflective surface.

3. An apparatus for measuring a curvature of a reflective surface comprising light source means for producing a first substantially collimated light beam and a second substantially collimated light beam substantially parallel to and spaced from said first light beam, means for mounting said source means to direct said first and second light beams onto a substantially smooth portion of the reflective surface to be measured, target surface means for receiving the reflected light beams from the surface to be measured, sensor means for viewing said target surface means and for calculating the separation of a pair of bright spot images formed on said target surface means by the reflected light beams.

4. An apparatus as set forth in claim 3 wherein said light source means including a first laser means for producing said first light beam and a second laser means for producing said second light beam.

5. An apparatus as set forth in claim 3 wherein said means for receiving the reflected light beams includes a diffuse target surface viewed by said sensor means.

6. An apparatus as set forth in claim 3 wherein said sensor means includes a linear array of light sensing elements arranged to view a portion of said target surface means including the pair of bright spot images and to produce respective output signals representative of the bright spot images.

7. An apparatus as set forth in claim 6 wherein said sensor means includes analog-to-digital conversion means for converting the output signals into corresponding digital values and computer means for determining the separation of the bright spot images from the digital values.

8. An apparatus for measuring the vacuum level in vacuum packed cans comprising light source means for producing a first substantially collimated light beam and a second substantially collimated light beam substantially parallel to and spaced from said first light beam, means for mounting said source means to direct said first and second light beams onto a substantially smooth portion of the reflective surface to be measured, target surface means for receiving the light beams after reflection from the surface to be measured, sensor means for viewing said target surface means and for calculating the separation of a pair of bright spot images formed on said target surface means by the reflected light beams.

9. An apparatus as set forth in claim 8 wherein said light source means including a first laser means for producing said first light beam and a second laser means for producing said second light beam.

10. An apparatus as set forth in claim 8 wherein said means for receiving the reflected light beams includes a diffuse target surface viewed by said sensor means.

11. An apparatus as set forth in claim 8 wherein said sensor means includes a linear array of light sensing elements arranged to view a portion of said target surface means including the pair of bright spot images and to produce respective output signals representative of the bright spot images.

12. An apparatus as set forth in claim 11 wherein said sensor means includes analog-to-digital conversion means for converting the output signals into corresponding digital values and computer means for determining the separation of the bright spot images from the digital values.

13. An apparatus as set forth in claim 8 and further including conveyor means for directing a reflective end surface of each of a plurality of cans past said means for mounting to subject each can to said first and second light beams.

14. An apparatus as set forth in claim 13 wherein said conveyor means includes control means responsive to an output signal from said sensor means to remove cans having improper vacuum levels from said conveyor means.

* * * * *